United States Patent
Webb et al.

(10) Patent No.: US 9,151,079 B2
(45) Date of Patent: Oct. 6, 2015

(54) ELECTRIC DOOR RELEASE POWERED BY ENERGY HARVESTER

(75) Inventors: Michael A. Webb, Cave Creek, AZ (US); Charles Christiansen, Glendale, AZ (US); Leland J. Hanchett, Jr., Cave Creek, AZ (US); Scott Sullivan, Cave Creek, AZ (US)

(73) Assignee: Hanchett Entry Systems, Inc., Phoenix, AZ (US)

( * ) Notice: Subject to any disclaimer, the term of this patent is extended or adjusted under 35 U.S.C. 154(b) by 1010 days.

(21) Appl. No.: 13/087,653

(22) Filed: Apr. 15, 2011

(65) Prior Publication Data

US 2011/0252845 A1 Oct. 20, 2011

Related U.S. Application Data

(60) Provisional application No. 61/324,698, filed on Apr. 15, 2010.

(51) Int. Cl.
*H02J 7/00* (2006.01)
*E05B 47/06* (2006.01)
(Continued)

(52) U.S. Cl.
CPC .......... *E05B 47/0673* (2013.01); *E05B 13/108* (2013.01); *E05D 11/00* (2013.01); *E05B 1/0007* (2013.01); *E05B 47/0011* (2013.01);
(Continued)

(58) Field of Classification Search
CPC ................................................. E05B 47/0673
USPC .......... 320/101; 70/101, 277, 278.7, 280–282
See application file for complete search history.

(56) References Cited

U.S. PATENT DOCUMENTS

| 8,274,383 B2* | 9/2012 | Mitchell et al. .......... 340/539.26 |
| 2007/0268132 A1* | 11/2007 | Milo .......................... 340/545.1 |

(Continued)

FOREIGN PATENT DOCUMENTS

| DE | 32 08 818 | 9/1983 |
| DE | 202 20 187 | 4/2003 |

(Continued)

OTHER PUBLICATIONS

Van Beurden, Jason., "Partial European Search Report," for European application 11003216.6, filed on Apr. 15, 2011, mailed May 7, 2013, The Hague.

(Continued)

*Primary Examiner* — Richard V Muralidar
(74) *Attorney, Agent, or Firm* — Woods Oviatt Gilman LLP; Ronald J. Kisicki, Esq.

(57) ABSTRACT

A system for operating an electric door release having an actuator powered by an energy harvester. The actuator may be a piezoelectric actuator and the harvester may be a piezo harvester. The system may further include a power module, a rechargeable battery and a voltage boost circuit disposed between the energy harvester and the actuator. When a piezoelectric actuator is used, a recycle actuator discharge circuit may be disposed between the piezoelectric actuator and the power module battery for recapturing a portion of the energy delivered to the piezoelectric actuator. The piezoelectric harvester may include an energy input portion whereby the piezo electric harvester is excited by the energy input portion. The energy input portion may include a circular or linear driving gear for exciting the piezoelectric harvester or a stepper motor generator, driven by movement of a door. The harvester may also be a stepper motor/generator.

42 Claims, 20 Drawing Sheets

(51) Int. Cl.
  *E05B 13/10* (2006.01)
  *E05D 11/00* (2006.01)
  *E05B 1/00* (2006.01)
  *E05B 47/00* (2006.01)
  *H02N 2/18* (2006.01)

(52) U.S. Cl.
  CPC .... *E05B2047/0062* (2013.01); *E05Y 2201/246* (2013.01); *E05Y 2201/43* (2013.01); *E05Y 2400/61* (2013.01); *E05Y 2400/616* (2013.01); *E05Y 2800/67* (2013.01); *E05Y 2900/132* (2013.01); *H02N 2/18* (2013.01); *Y10T 70/5199* (2015.04); *Y10T 292/57* (2015.04); *Y10T 292/705* (2015.04)

(56) References Cited

U.S. PATENT DOCUMENTS

2009/0072662 A1* 3/2009 Sadler et al. ............... 310/319
2009/0273322 A1   11/2009 Riley et al.

FOREIGN PATENT DOCUMENTS

| DE | 10 2005 022930 | 11/2006 |
| DE | 10 2007 032855 | 1/2009 |
| JP | 2004 204533 | 7/2004 |

OTHER PUBLICATIONS

Partial English Translation of German Reference No. DE 3208818A1, p. 14, line 34 through p. 16, line 6.

* cited by examiner

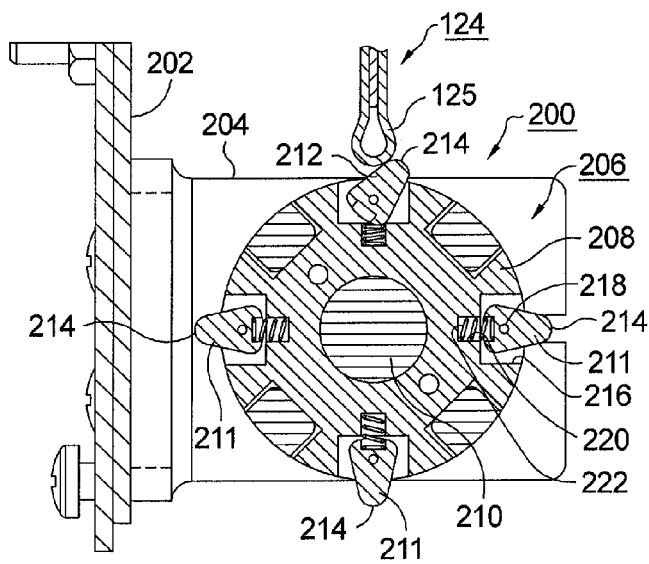
FIG. 6.
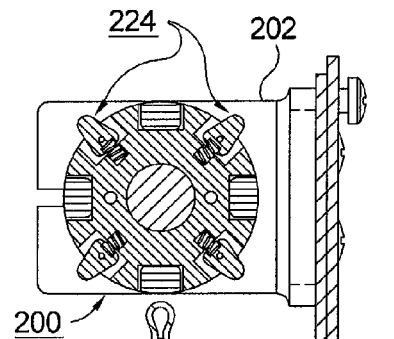
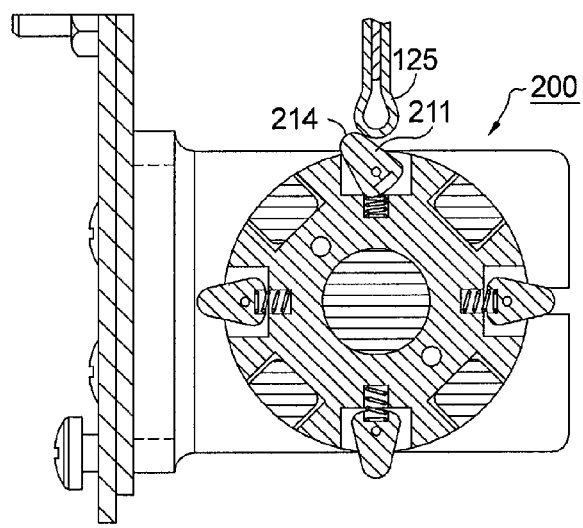
FIG. 7.
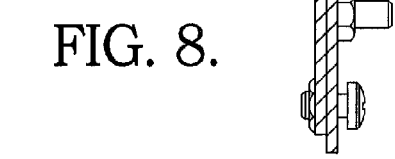
FIG. 8.

ELECTRIC DOOR RELEASE POWERED BY ENERGY HARVESTER

CROSS-REFERENCE TO RELATED APPLICATIONS

This application claims the benefit of U.S. Patent Application No. 61/324,698, filed Apr. 15, 2010. U.S. Patent Application No. 61/324,698 is hereby incorporated by reference in its entirety.

TECHNICAL FIELD

The present invention relates to electrically operated devices associated with a door or closure, more particularly, to mechanisms for electrically locking or unlocking a door in a frame; further, to such mechanisms wherein the power to operate the electrical mechanism is collected and provided by an energy harvester; and most particularly, to an electric door release mechanism which may be actuated by a piezoelectric actuator powered by an energy harvester such as, for example, a piezoelectric energy harvester.

BACKGROUND OF THE INVENTION

So-called "energy harvesters" and "energy harvesting" refer generally to apparatus and methods for collecting and storing energy present in the environment, such as heat or solar energy, RF energy, and kinetic energy such as low frequency excitation or rotation. Such energies are referred to herein as "waste" or "free" energies. Storing is typically in the form of conversion of waste energy to electricity for subsequent storage in a battery.

Electrically operated devices that are mounted in or on a door or at a remote closure, such as, for example, electric door release mechanisms, illumination devices, video screen displays, keypads and signage, are known. Electric door release mechanisms in particular, such as electrically-operated door strikes or door locks, are useful in providing remote or hands-free unlocking operation of a door in a frame, or for providing selective security for items within an area bounded by such a door. In the most general prior art, an electric door release mechanism is powered by a remote electric source, such as an AC grid, connected by a cable, through a transformer, to the unlocking device. The electric door release mechanism may be configured for mounting and operation in the door frame, to engage a cooperative bolt in the door, or the electric door release mechanism may be mounted in the door itself, requiring the cable to pass through the door hinge area in some fashion.

In some specialized applications wherein a power source such as an AC grid is not available or readily connectable to the electric door release mechanism, it is known to power an electric door release mechanism via a battery incorporated in or immediately proximate the door release system. Such a configuration has the disadvantage that the battery either must be kept charged in some fashion or must be replaced periodically, with risk of security failure if not timely replaced or if the recharging means fails. Further, prior art electric door release mechanisms typically are actuated by a relatively large and powerful linear solenoid or motor. Thus, where hard wiring of the mechanism from a remote power source is not possible, practical or desired, an undesirably large and expensive battery pack for operation of the electric door release mechanism is required.

What is needed in the art is an electrically operated door device such as an electric door release system wherein the power to a device can be supplied by harvesting of "waste" energy available locally.

What is further needed in the art is an electric door release system wherein the actuator requires significantly less electric power than in the prior art.

It is a principal object of the present invention to provide a secure environment wherein security is dependent upon a locally available source of waste energy, and wherein periodic human intervention is unnecessary.

SUMMARY OF THE INVENTION

Briefly described, a system for powering an electrically operated door device such as an actuator in an electric door release system, in accordance with the present invention, comprises an energy harvester for providing power to the device. The system may include a voltage boost circuit operationally connected to the energy harvester, and a device such as a piezoelectric actuator connected to the voltage boost circuit. The system may further include a power module including a battery, such as a thin film battery, disposed in a circuit between the energy harvester and the voltage boost circuit, and an actuator discharge circuit disposed between the piezoelectric actuator and the power module battery for recycling back to the battery a portion of the power provided to, and not consumed by, the piezoelectric actuator.

In one aspect of the invention, this system is readily adaptable to an electric door release system wherein an electric door release mechanism is actuated by a piezoelectric actuator powered by an energy harvester. Such an electric door release system in accordance with the present invention comprises: a) a mechanical release mechanism including a piezoelectric actuator for locking or unlocking the mechanism, and b) an energy harvester for providing electric power to the piezoelectric actuator. The energy harvester may be a piezoelectric device or any other type of harvester for collecting waste energy, for example, a stepper motor/generator whose rotor is turned by a door hinge member.

For use in an environment having variable or relatively low frequency of local waste energy occurrences, a rechargeable battery may be included between the energy harvester and the actuator. Preferably, control circuitry limits the draw on the battery to only the actual amount of power required to energize the piezoelectric actuator. Further, a voltage recycling circuit may be used whereby a substantial amount of the power provided to the piezoelectric actuator may be re-captured and returned to the battery for storage.

For use in environments having a more continuous level of waste energy available, in another aspect of the invention, the battery may be supplanted by a compound Greinacher-type voltage doubler circuit having substantial electrical capacitance that multiplies the voltage output of an energy harvester up to voltage potential required to energize the piezoelectric actuator.

In either arrangement, the energy generated by the harvester must be sufficient to keep the battery or capacitors fully charged so as to satisfy future actuator requirements.

BRIEF DESCRIPTION OF THE DRAWINGS

The present invention will now be described, by way of example, with reference to the accompanying drawings, in which:

FIGS. 6 and 7 are alternate cross-sectional views showing a rotatable actuating sprocket assembly in accordance with the present invention actuating a ballast of a piezoelectric energy harvester;

FIG. 8 is a cross-sectional elevational view of a mechanical actuator assembly in accordance with the present invention;

Corresponding reference characters indicate corresponding parts throughout the several views. The exemplifications set out herein illustrate currently preferred embodiments of the invention, and such exemplifications are not to be construed as limiting the scope of the invention in any manner.

DESCRIPTION OF THE PREFERRED EMBODIMENTS

Figure 1:
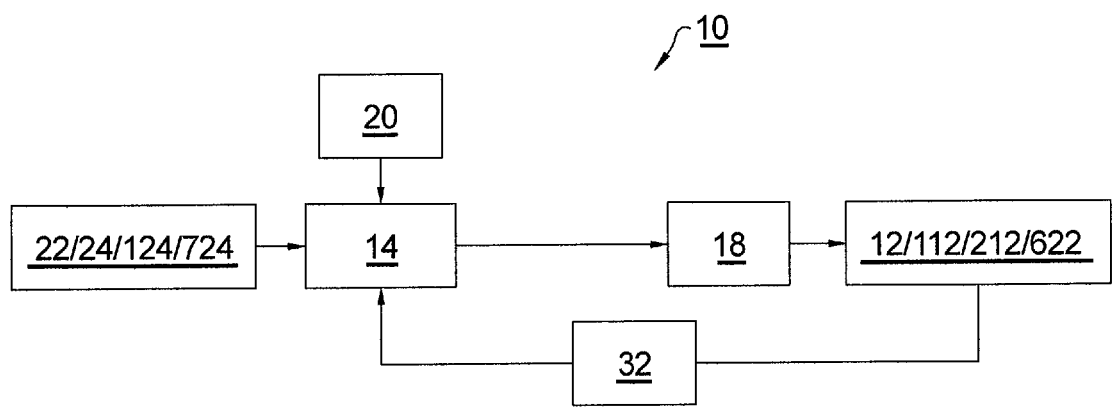
FIG. 1 is a block diagram of a system for harvesting and utilizing sporadically available waste energy in accordance with the present invention.

Referring to FIG. 1, a system 10 is shown for harvesting and utilizing waste energy to power an electrically operated door device such as a door release actuator in accordance with the present invention. System 10 comprises a device 12 such as a door release actuator 112; in one aspect of the invention, as described further herein, device 12 may be for example a low power consumption actuator, such as a piezoelectric actuator 212. When piezoelectric actuator 212 is used to release a door latch, system 10 may be powered by a power management module 14 that powers a voltage booster 18 for increasing voltage to a level sufficient to energize piezoelectric actuator 212. Power management module 14 is responsive to a door-release authorization signal 20 and receives power from any waste energy harvester 22, such as, for example, RF or solar cell harvesters, or other known sources of waste energy as described above, or alternately from a piezoelectric energy harvester 24 which may be configured to harvest door motion energy or door or building vibration energy. In the specific example described below, piezoelectric energy harvester 124, configured for releasing a door latch, may be incorporated into the hinge region of an electrically secured door for capturing the energy of any and all motion and vibration associated with the opening and closing of the door and other waste energy in the vicinity of the door available for capturing. In yet another specific example described below, a stepper motor generator 724 may be incorporated into the hinge region for capturing the energy associated with opening and closing the door.

Figure 2:
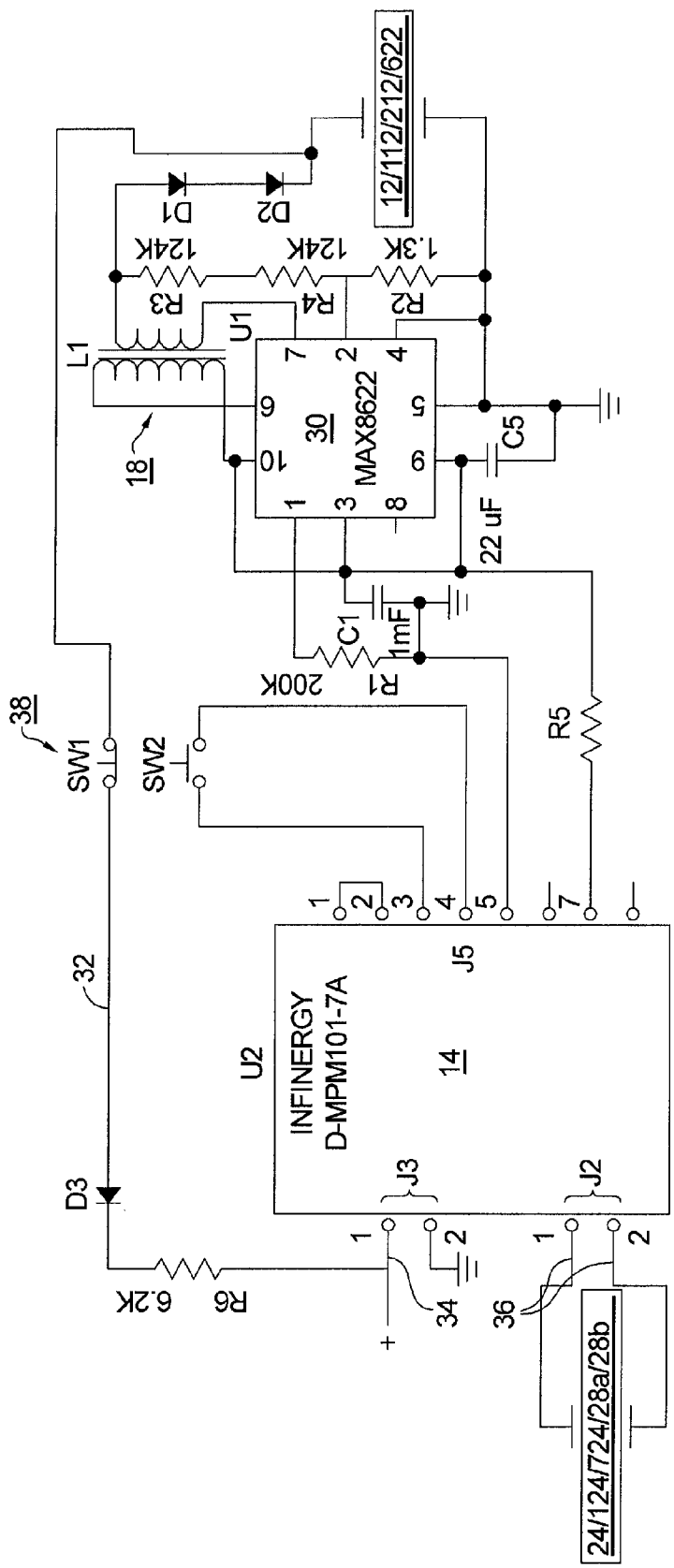
FIG. 2 is a detailed exemplary circuit diagram of the system shown in FIG. 1.
Figure 5:
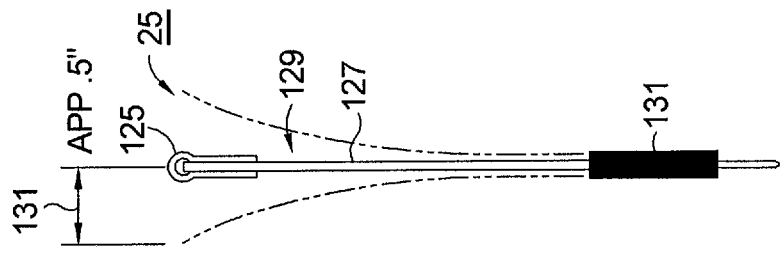
FIG. 5 is an edge view of the piezoelectric energy harvester shown in FIG. 4.
Figure 4:
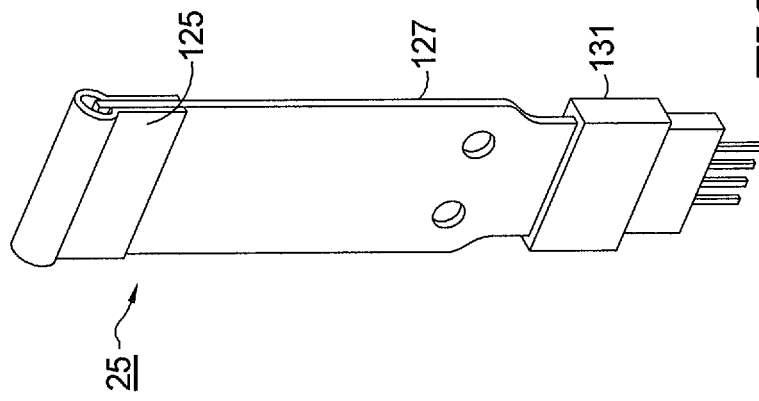
FIG. 4 is an isometric view of a commercially-available piezoelectric energy harvester.

Referring to FIGS. 4 and 5, piezo transducer 25 that may be used in piezo energy harvester 24 is preferably a Model M-8528-P2, available from Smart Materials Corp., Sarasota, Fla., USA, or a Model Volture V25w, available from Mide Technology Corp, Medford, Mass., USA. Either of these devices develops a damped sinusoidal voltage output when strained in either direction and allowed to vibrate about a fixed end point. Referring to FIG. 2, the damped sinusoid output from piezo transducer 25 is supplied to a schottky diode bridge rectifier (not shown), the output of which is used to charge a thin film battery (not visible) such as that found in micro power module (MPM) 14, preferably a Model D-MPM101, available from Infinite Power Solutions, Inc., Littleton, Colo., USA. Additionally or alternatively, an ambient RF or light energy harvester or a stepper motor/generator 724 (FIGS. 25-29), for example a model 17PU-H hybrid stepper motor available from Minebea Motor Corp., Tokyo, Japan, model 17PU-H, can also be used to harvest energy for charging MPM 14.

In addition, RF energy 28a may be captured on a steel door frame and boosted by a charge pump in known fashion to provide a DC output which is then used on the DC charging input of MPM 14. Similarly, ambient light levels can be detected by a solar cell 28b such as the Sanyo AM-1454 and the voltage output can be added into the DC charging input for MPM 14.

MPM 14 has a regulated output voltage enable circuit which determines the period of time during which the battery is being drained as it supplies current to the voltage boosting circuit. Output energy from MPM 14 can be provided by something as simple as a switch, or by any set of contacts which are closed only after verification of credentials for the person desiring to enter the door. Another function provided by the MPM is to discontinue output voltage if the battery voltage has fallen to less than 60% of its fully charged voltage. Normally, this would never happen as it is the intent of this invention to keep the battery at or near full charge by applying more energy at the recharge inputs than the energy used by the piezo actuator and its control circuitry for each operation of the door.

Typically, a piezo actuator such as piezoelectric actuator 212 needs voltage on the order of about 225 volts for proper operation. This voltage level is accomplished by employing a capacitor charge device 30 (FIG. 2), preferably a Maxim Max 8622, available, for example, from Maxim, Sunnyvale, Calif., USA, which converts a low voltage battery output to a voltage level needed by the piezo actuator.

Numerous piezo cells for use in piezoelectric actuator 212 are available today. A Servo Cell AL2, available from Servo-Cell, Ltd., Harlow, UK, is found useful as it is a fully integrated unit that provides mechanical blocking of its linear displacement, permitting the piezo actuator to replace an electric solenoid in a slightly modified current production electric strike, as described below. Other piezo actuators, such as the Mide Quick Pack qp2On, available from Mide, Inc., Medfor, Mass., USA, may be used as a means of moving a blocking element to accomplish door unlocking.

An interesting byproduct of the use of piezoelectric actuator 212 is that once charging of the piezo cell is complete and motion accomplished, it is possible to recapture a percentage of the energy expended in actuating the device by discharging the actuator's capacitance back into the DC charge input of the MPM. Theoretically, one can re-capture via recycle circuit 32 up to 60% of the original energy expended. Thus the actual power consumption of the piezoelectric actuator is substantially reduced.

The electronic circuitry used to capture the harvested energy and use it to power the piezoelectric actuator consists of two elements—the MPM 14, and voltage booster 18.

Referring to FIG. 2, MPM 14 contains three connectors, J2, J3 and J5. The first two are used to recharge the battery from DC and AC sources respectively. J2 collects recycled energy 34 from the discharge of piezoelectric actuator 212. J3 may be used to collect additional waste energy from a variety of waste energy sources including, for example, collected RF energy 28a and collected solar energy 28b. When used to collect energy from piezoelectric energy harvester 24,124 or stepper motor/generator 724, J3 takes the harvested door motion energy via output 36. Since energy recoverable from door motion is readily available, it is the primary source of harvested waste energy to recharge the battery. Connector J5 is used for input and output signals. Pins 1 and 2 provide under voltage protection to ensure that the battery output never drops below 2.1 volts. Pins 3 and 4 receive enabling signals for the regulated 3.6 volt output provided at pin 7. Pin 5 is an isolated ground that does not connect directly to the ground of the internal thin film battery. The output voltage from pin 7 MPM 14 provides a low voltage, such as 3.6 volts. Capacitors C5 and CI filter some of the noise signal created by the switching regulator in the voltage booster. Voltage booster 18 includes a charge device that uses a switching regulator and output transformer to boost an input voltage to an output voltage, for example 200 v. to 250 v., which is needed by the piezoelectric actuator 212. Resistor R2 sets the output level which the unit is trying to achieve. In this case, it is set to 237 volts. Resistor R1 establishes the maximum input draw for the unit which is set as low as possible. Diodes D1 and D2 ensure that no back current is supplied to voltage booster 18 when the piezo actuator is discharging. Diode D3 and resistor R6 limit the current which can be fed back to recharge the battery through the DC charging input J2. Switch 38, designated SW1, applies the re-captured voltage to the battery after the unlock pushbutton is released.

The timing sequence is then:
1) Unlock pushbutton switch 38 is depressed. This opens the re-charge feedback loop and enables the MPM output.
2) Charge device 30 of voltage booster 18 powers piezoelectric actuator 212 until the charge on the actuator reaches the preset level of 237 volts.
3) Unlock push button switch 38 is released and the discharge of piezoelectric actuator 212 is sent back to the battery via circuit 32.

Figure 3:
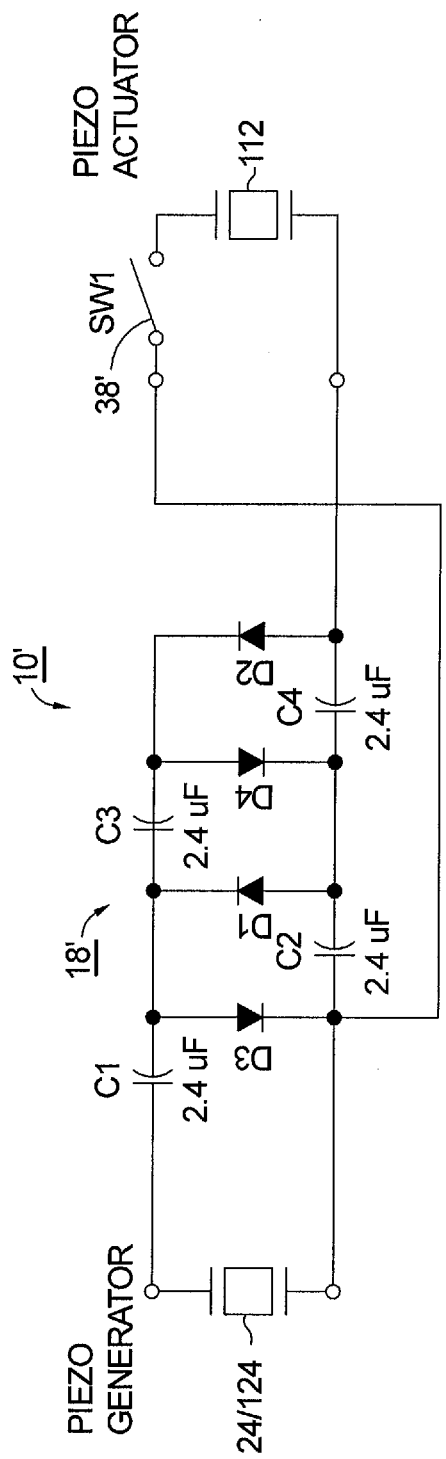
FIG. 3 is a circuit diagram of a system for harvesting and utilizing continuously available waste energy in accordance with the present invention.

Referring now to FIG. 3, in an environment experiencing a continuously-available, ample source of waste energy wherein an energy harvester can have a continuous electrical output, it may be possible to use a simplified system 10' for harvesting and using waste energy to power a low power consumption actuator such as piezoelectric actuator 112. Note that a power module is not required, although the actuator discharge circuit can be used to support the charge on the doubling capacitors. System 10' comprises a piezo harvester, such as for example piezoelectric energy harvester 124, a voltage boost circuit 18', an operating switch SW1 38', and a piezoelectric actuator 212. Voltage boost circuit 18' is preferably a Greinacher-type circuit comprising a plurality of capacitors and diodes as is known in the prior art to boost the harvester output to the voltage potential required to drive the piezoelectric actuator 212. Obviously, in circumstances wherein waste kinetic energy is not continuously available, a battery and control circuitry as shown in FIG. 2 are required to accumulate waste kinetic energy as it occurs and to energize actuator 212.

Referring now to FIGS. 4 and 5, a piezoelectric transducer 25 is shown, such as the Mide Model Volture V25w cited above. Transducer 25 may be used in piezoelectric energy harvester 24,124. This device converts vibration into electrical energy when the ballast 125, mounted on base plate 127 which also contains the piezo device, is flexed in either direction from the rest position 129. Transducer 25 has good elastic attributes that allow it to deflect 131 from center up to about 0.25 inches on either side of rest position 129.

Referring now to FIGS. 6 through 8, a mechanical actuator assembly 200 is shown that may be used in conjunction with piezoelectric energy harvester 124. Mechanical actuator assembly 200 comprises a base plate 202 and stanchion 204 for rotatably supporting a rotatable actuating sprocket assembly 206. Sprocket assembly 206 comprises a yoke 208 mounted on a shaft 210 journalled in stanchion 204 and includes a plurality of actuators 211, exemplarily four, mounted for both pivoting and translating in yoke 208 as described below. Each actuator 211 is provided with a rounded nose 214, rides in a first radial slot 216 formed in yoke 208, and is pivotably pinned by a pin 218 into a second slot 220 formed in yoke 208. Each actuator 211 captures a bias spring 222 in second slot 220 such that each actuator is urged after perturbation to return to a rest position 224 as shown in FIG. 8. Thus, each actuator 211 during rotation of sprocket assembly 206 and sequential engaging with, and disengaging from, ballast 125 of a piezoelectric energy harvester 124 is free to move rotationally on pin 218 in either direction (FIGS. 6 and 7) and to move translationally radially in first and second slots 216,220 in response to being perturbed by rotation of assembly 206 in either direction as described below.

Figure 9:
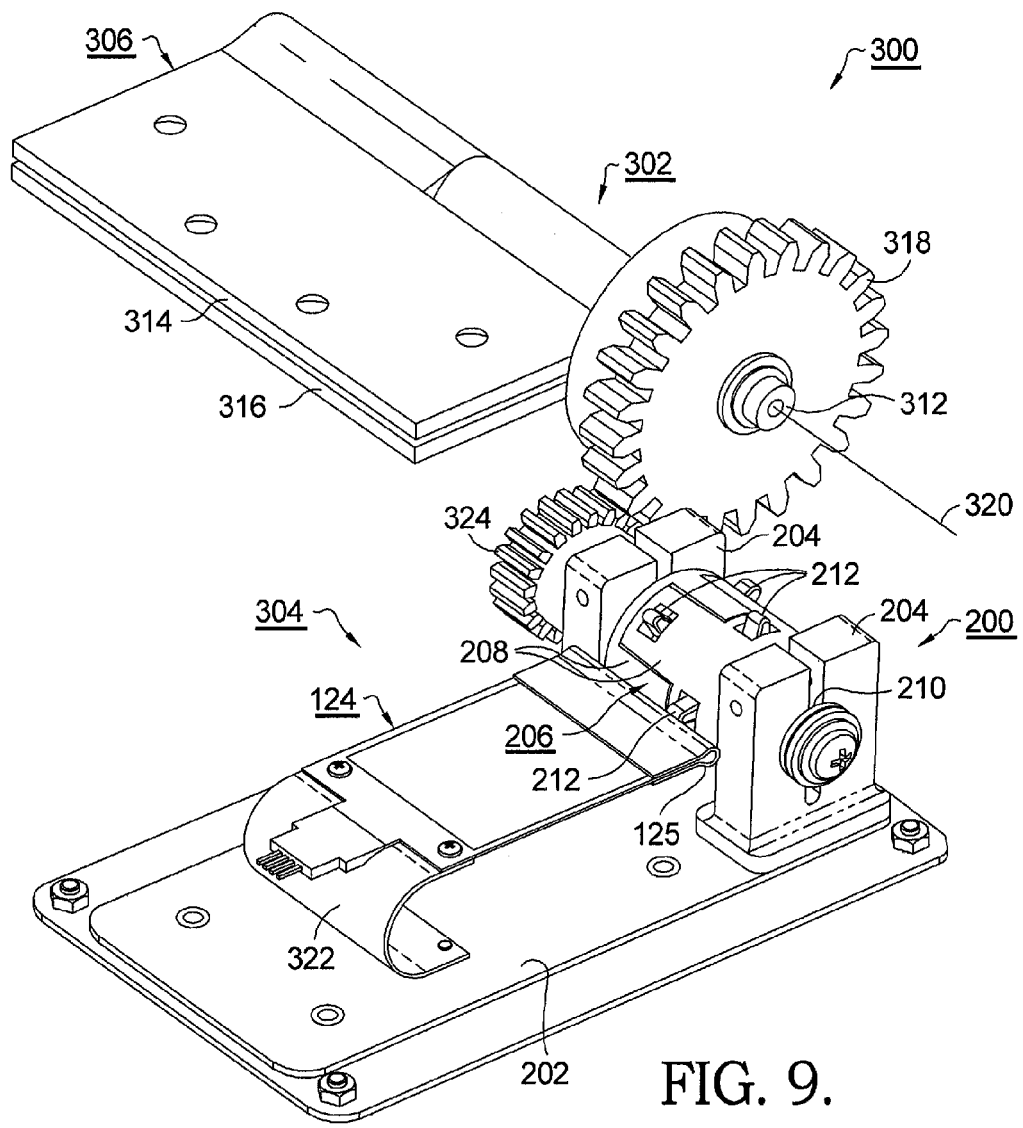
FIG. 9 is an isometric view of a first piezoelectric energy harvester system in accordance with the present invention comprising an energy input portion and an energy harvesting portion.
Figure 10:
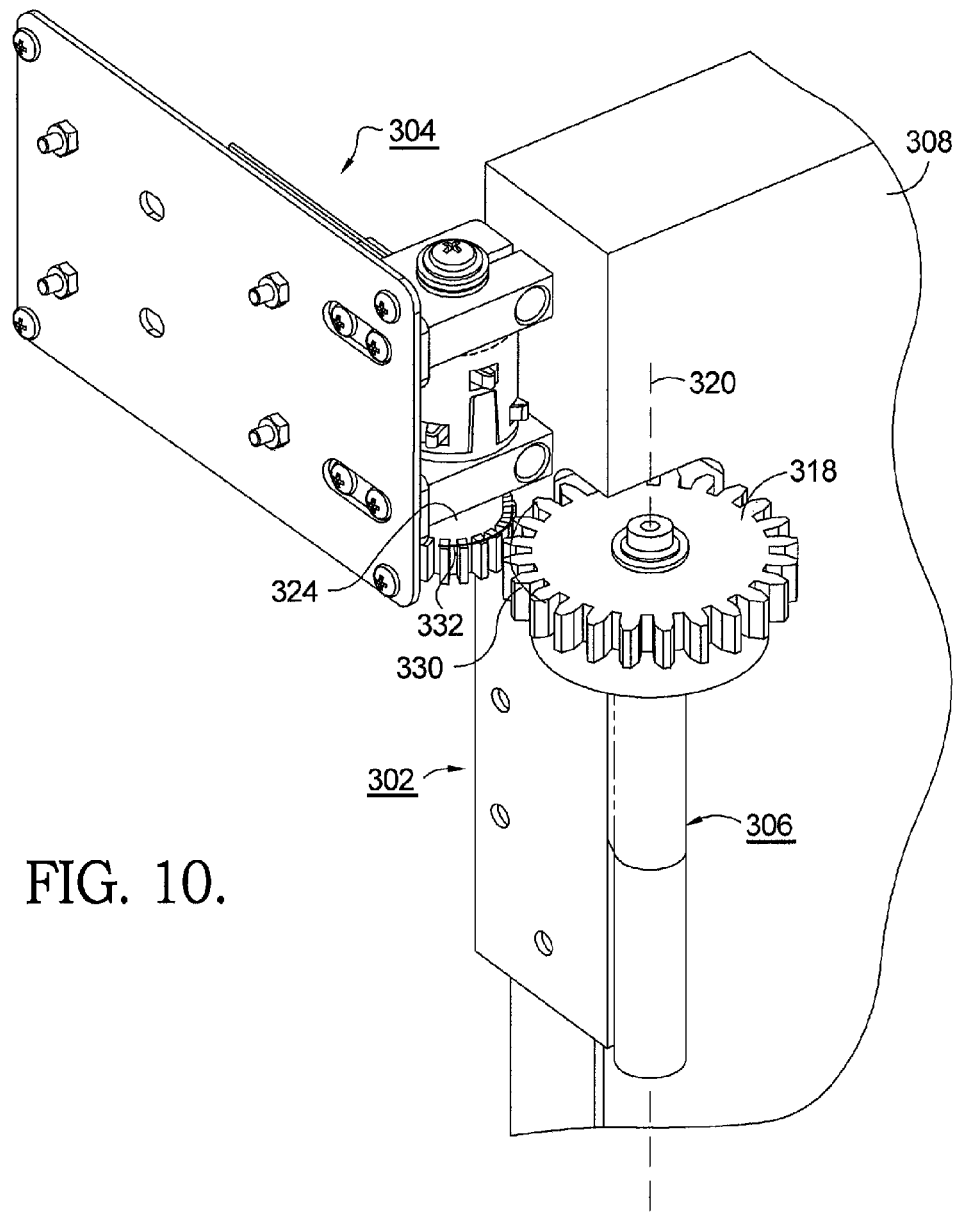
FIG. 10 is an isometric view showing the first piezoelectric energy harvester system shown in FIG. 9.
Figure 11:
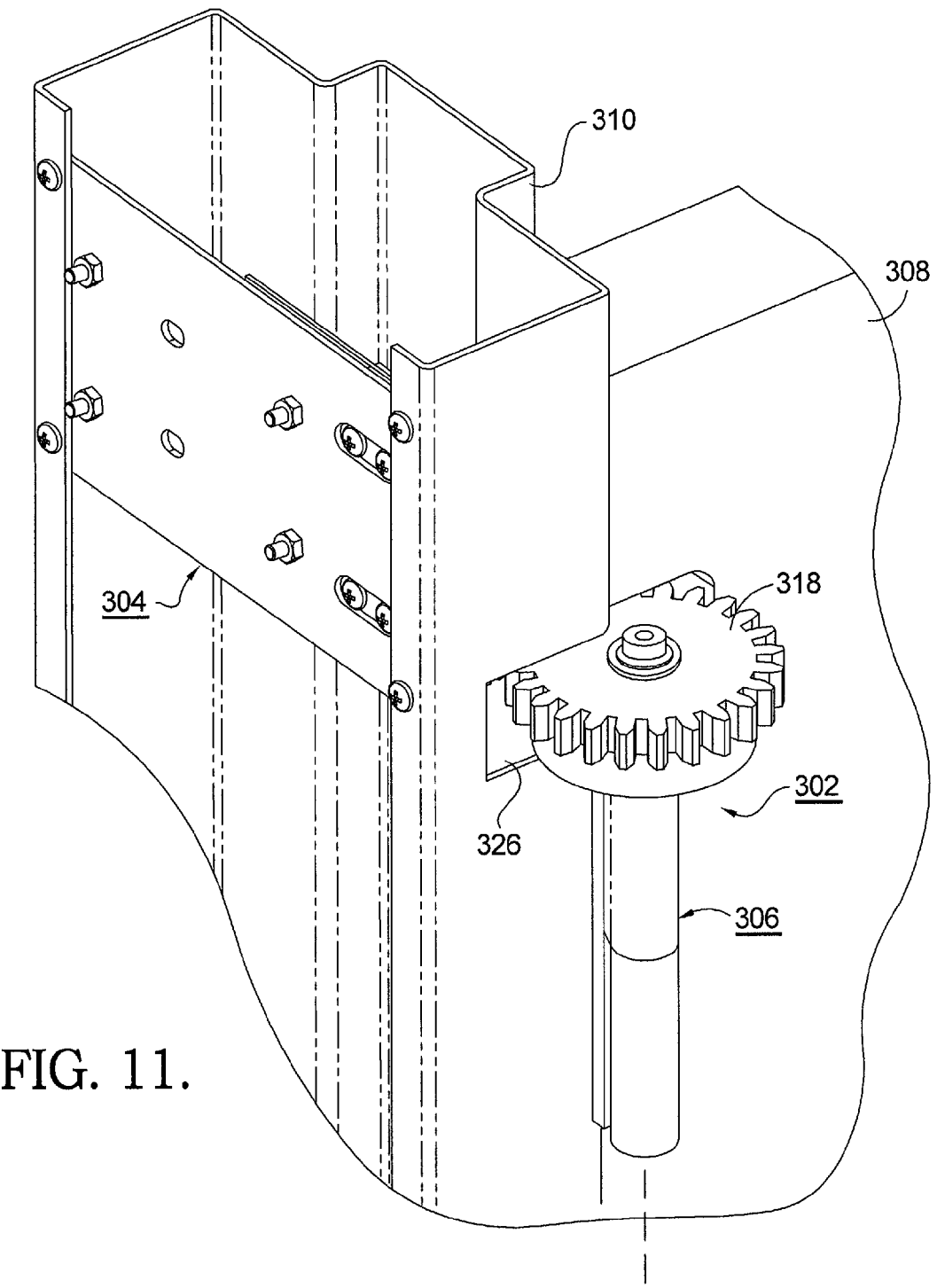
FIG. 11 is an isometric view like that shown in FIG. 10, showing the energy harvesting module disposed within a hollow door frame.

Referring now to FIGS. 9 through 11, a first piezoelectric energy harvester system 300 in accordance with the present invention comprises an energy input portion 302 and an energy harvesting portion 304.

Energy input portion 302 comprises a door hinge 306 mountable to a door 308 in door frame 310 to cause the door 308 to swing in the frame 310. A hinge pin 312 extends beyond the leaves 314,316 of hinge 306 and fixedly supports a drive member such as a hinge pin spur gear 318. Hinge pin 312 is attached to the door-mounting leaf 316 of hinge 306 such that pin 312 and gear 318 remain fixed and stationary with respect to door 308 but rotate about hinge pivot axis 320 when door 308 is swung on hinge 306.

Energy harvesting portion 304 comprises a piezoelectric energy harvester 124 as shown in FIGS. 4 and 5 mounted via a bracket 322 to base plate 202 of a mechanical actuator assembly 200. Mechanical actuator assembly 200 comprises base plate 202 and first and second stanchions 204 for rotatably supporting a rotatable sprocket assembly 206. Sprocket assembly 206 comprises first and second yokes 208 fixedly mounted on a shaft 210 journalled in stanchions 204. First and second yokes 208 are opposed on shaft 210 and are crenellated to be mutually out of phase by 45° such that sprocket assembly 206 provides 8 actuators 211 for engaging harvester ballast 125. Shaft 208 extends beyond stanchion 204 to support a driven member such as capture (pinion) gear 324 meshed with hinge pin (spur) gear 318.

Energy harvesting portion 304 defines an energy harvesting module that preferably includes a cover (not shown) for protecting harvester 124 and sub-assembly 206 from the environment, as well as to reduce the noise of engagement of the gears and the actuators with the ballast.

An advantage of piezoelectric energy harvester system 300 is that the driver/driven ratios may be selected to maximize energy harvest for a particular application. Further, the mass of ballast 125 may be selected to match the anticipated door velocity and thus optimize the resonance periods between ballast/actuator engagements to maximize energy output of harvester 124.

Referring now to FIGS. 10 and 11, an exemplary installation of harvester system 300 is shown. Energy input portion 302 is mounted to an edge of door 308, and energy harvesting portion 304 is mounted within a hollow frame 310 which is slotted 326 to provide access for gear 318 to gear 324. Energy is captured by harvester 124 during opening and closing motions of the door in the frame.

Figure 12:
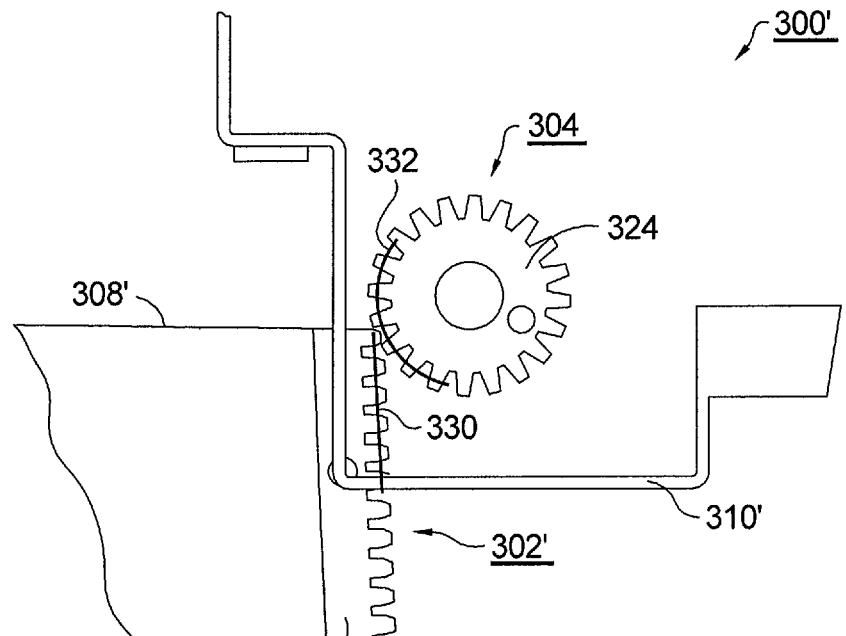
FIG. 12 is a schematic cross-sectional view of a second piezoelectric energy harvester system in accordance with the present invention, showing an energy input portion, using a rack gear mounted on a door edge, beginning engagement with an energy harvesting portion.
Figure 13:
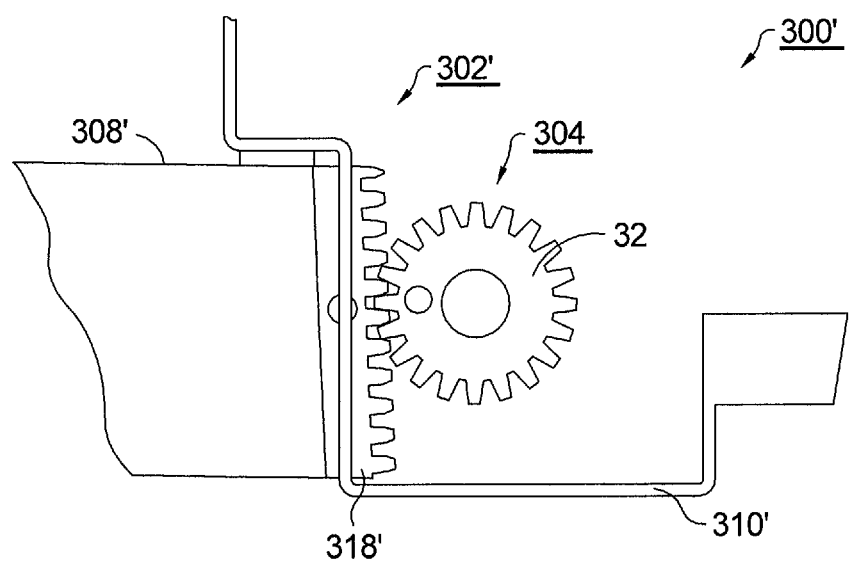
FIG. 13 is a view like that shown in FIG. 12, showing the energy input portion in full engagement with the energy harvesting portion as would occur with the door closed.

Referring now to FIGS. 12 and 13, a second piezoelectric energy harvester system 300' in accordance with the present invention comprises an energy input portion 302' and the energy harvesting portion 304 described above. Only capture pinion gear 324 of portion 304 is shown.

System 300' harvests kinetic energy from the door-latch side of a door 308' mounted in a hollow frame 310', as opposed to embodiment 300 which harvests energy from the hinge side. In system embodiment 300', energy harvesting portion 304 is mounted within frame 310', and energy input portion 302' includes a drive member such as linear rack gear 318' mounted to the beveled edge of door 308' for engaging the driven member (pinion gear 324) to drive energy harvesting portion 304 as in the first system embodiment 300. It will be seen that energy is harvested both in opening and in closing door 308'.

Referring to FIGS. 10 and 12, with respect to systems 300 and 300', to reduce cost and noise, it is understood and contemplated by this invention that drive gears 318, 318' can be replaced with friction wheels having, for example, a resilient contact surface 330 and driven gears 324, 324' can be replaced with a friction wheel or a friction rack having, for example, a mating resilient surface 332.

Figure 14:
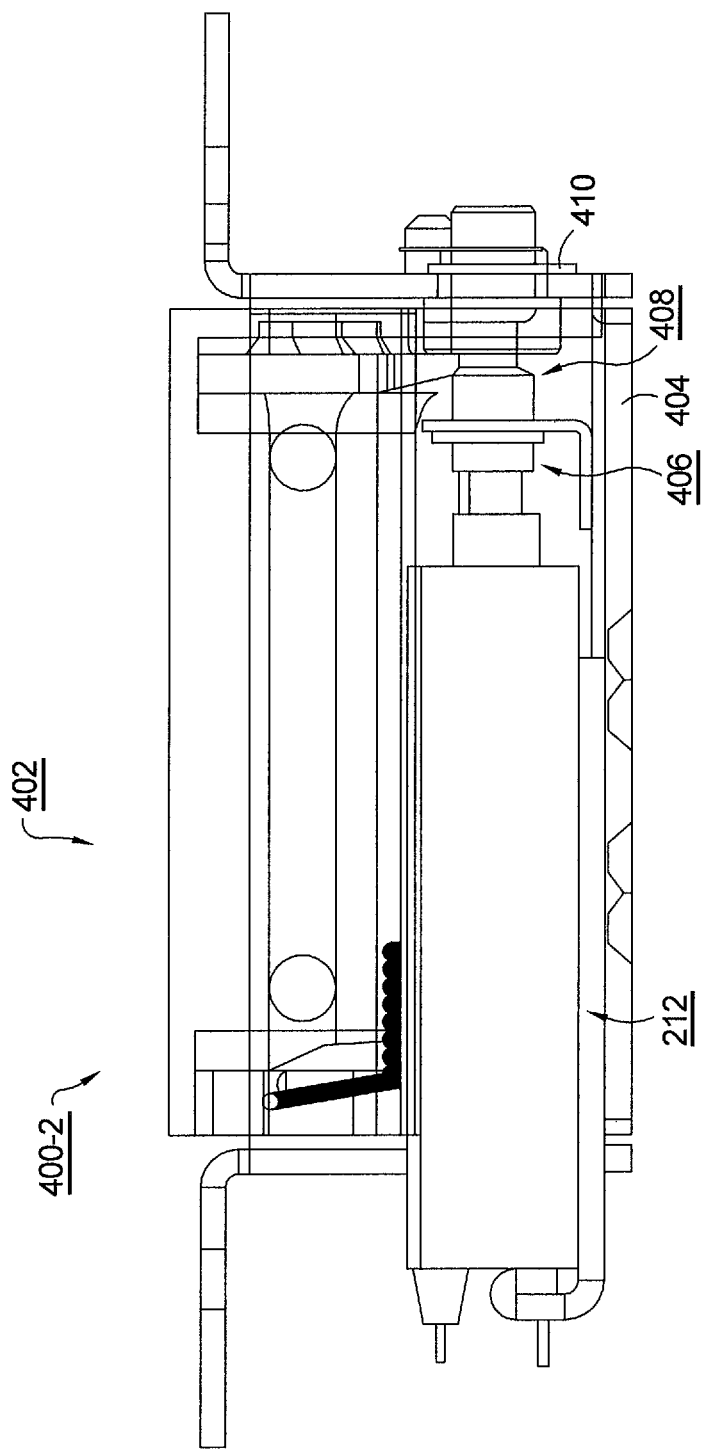
FIG. 14 is a side elevational view of a piezoelectric actuator disposed in a door strike in accordance with the present invention.
Figure 15:
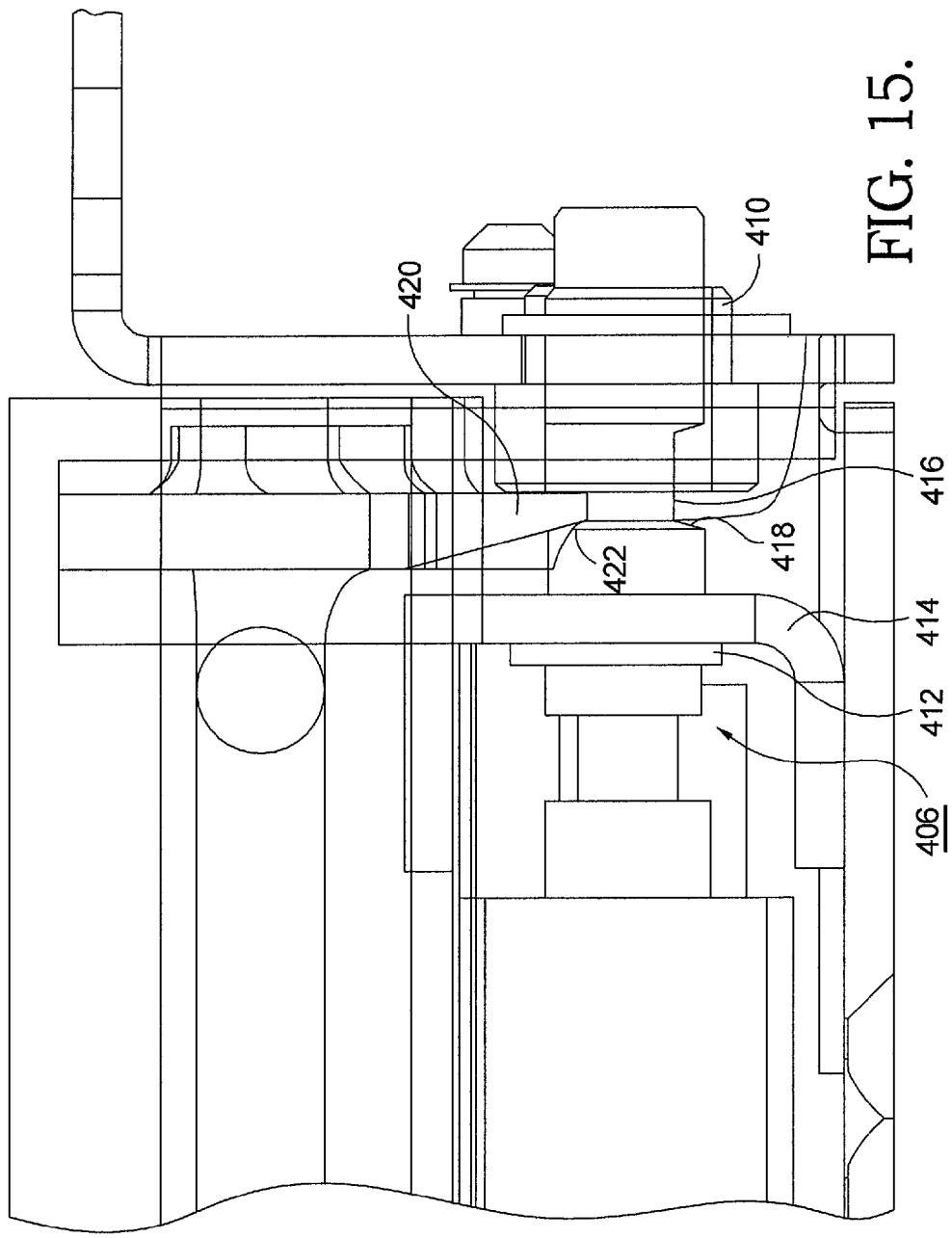
FIG. 15 is an enlarged view of the mechanical operating portion of the door strike shown in FIG. 14.
Figure 16:
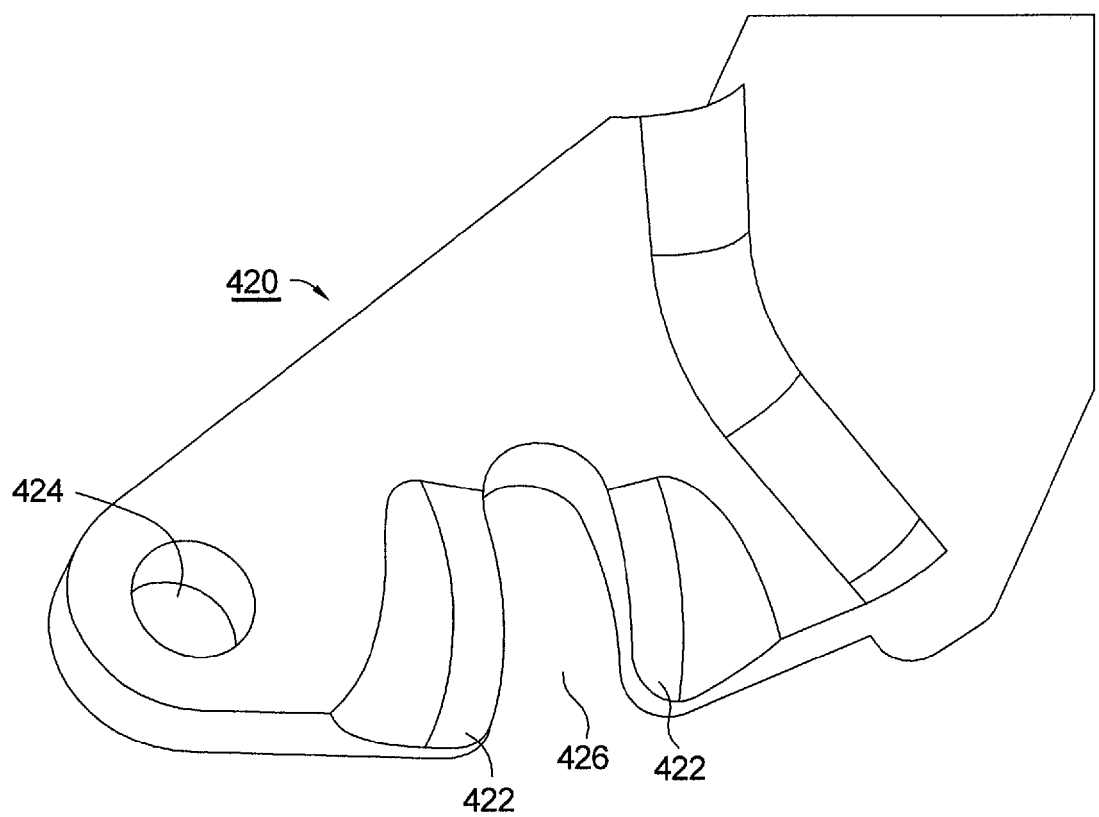
FIG. 16 is a perspective view of a portion of the keeper shown in FIGS. 14 and 15.

Referring now to FIGS. 14 through 16, as one embodiment, an electric strike portion 400-2 of an electric door strike system in accordance with the present invention comprises an electric strike 402, for example, a Model 5000 available from Hanchett Entry Systems, Inc., Phoenix, Ariz., USA, modified as described below to include a piezoelectric actuator 212 in place of a standard linear electric solenoid (not shown). For simplicity and clarity, only the mounting and actuation portion of strike 402 are shown.

Strike 402 comprises a formed metal frame 404 supporting piezoelectric actuator 212 having a shaft 406 extending longitudinally therefrom. Shaft 406 includes an actuation portion 408 extending through a linear bearing 410 mounted in frame 404. Actuation portion 408 includes a collar 412 to limit axial motion of shaft 406 away from actuator 212 by engagement with a support bracket 414 also mounted on frame 404. Actuation portion 408 further includes an annular groove 416 having a beveled side defining a shaft engagement slope 418 for receiving a keeper 420 having a mating engagement slope 422. Keeper 420 is a blocking link in the linkage releasing or locking a latch (not shown) in strike 402.

Referring to FIG. 16, keeper 420 includes pivot hole 424 for mounting to strike 402 and an arcuate slot 426 concentric with the axis of pivot hole 424. The lands on either side of slot 426 are tapered to form engagement slope 422 as shown in FIGS. 14 and 15.

Referring again to FIG. 15, shaft 406 is shown in the blocking position wherein keeper 420 blocks the linkage from activating to unlock the latch. Shaft 406 is biased to the right in FIG. 15 by one or more bias springs (not visible). The shaft bias springs are sufficiently powerful that, in combination with the de-energized piezo cell, the keeper is maintained in the locking position against a latch-opening force sufficient to resist unwanted unlocking of the lock, as for example, up to at least 1000 pounds of latch-opening force. When the piezo cell in actuator 212 is energized, the cell actuates a blocking element, permitting shaft 406 to move to the left, allowing keeper 420 to rotate to move groove 416 farther into slot 426, in which position keeper 420 no longer blocks the linkage and the latch is thus unlocked. In this condition, a relatively small manual force applied to the latch as by a person attempting to open the door is sufficient to displace the shaft to the left and allow the keeper to be forced into the unlocking position by engagement of the engagement slopes 418,422. Conversely, when the piezo cell is de-energized, the combined force of piezo cell expansion and the bias springs displaces the shaft to the right, causing the keeper to be returned via engagement slopes 418,422 to the locking position shown in FIGS. 14 and 15.

While energy harvester systems 300 and 300' are shown utilizing sprocket assembly 206 having an array of spring-loaded actuators 212 for purposes of absorbing some of the contact forces that would be imparted on ballast 125, it is understood that, within the scope of the invention, sprocket assembly 206 may be simply a wheel having a select number of radial teeth for making contact with ballast 125.

Figure 17:
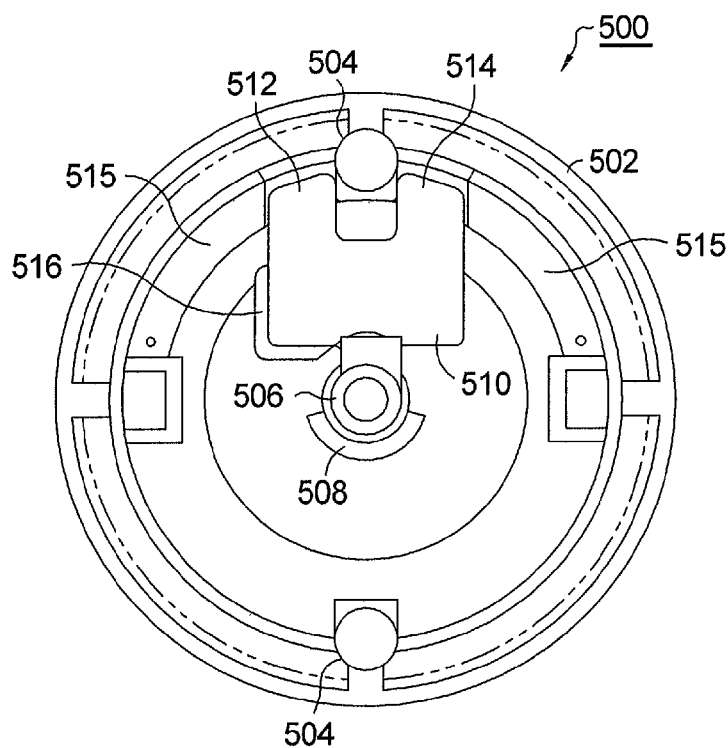
FIG. 17 is an elevational view of a prior art key operated door locking mechanism.
Figure 21:
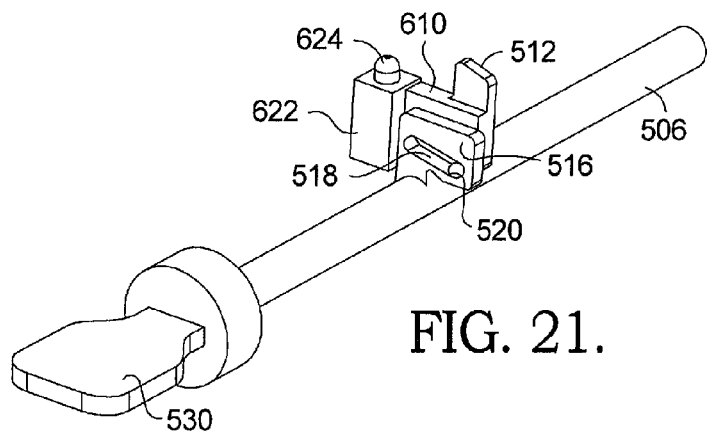

Referring to FIG. 17, an exemplary, prior art handle-lock set 500, for example, a commercially available key-in-knob-lock, comprises a hub 502 having first and second connecting posts 504 extending therefrom for receiving screws (not shown) extending through a door and bezel (not shown). A locking shaft 506 and latch engaging shaft 508 extend through an opening in hub 502. Locking shaft 506 is connected to key 530 but is turnable independently of latch engaging shaft 508 which is attached to knob 509. Cooperative with locking shaft 506 is a floating locking tab 510 having spaced-apart first and second locking tangs 512,514 straddling upper connecting post 504 within locking ring 515. As shown below in FIG. 21 in connection with the disclosure of the present invention, a cam plate 516 having an angled slot 518 is mounted to locking shaft 506. A pin 520 attached to locking tab 510 extends through slot 518. Slot 518 is formed such that upon rotation of locking shaft 506 (clockwise in FIG. 21; counterclockwise in FIG. 17), locking tab 510 is moved inwardly along a radius of hub 502 until tangs 512/514 no longer straddle connecting post 504 and can clear locking ring 515, permitting knob 509 and latch engaging shaft 508 to be rotated, thereby actuating a door latch (not shown) to open the door (not shown).

Referring now to FIGS. 18-21, in a handle-lock set 600 in accordance with the present invention, floating locking tab 510 is modified to define a novel floating locking tab 610 in accordance with the present invention. Prior art tang 512 is retained, but prior art tang 514 is replaced by assembly 623 comprising a piezoelectric actuator 622 and a domed plunger 624. Locking ring 515 is modified to define a novel locking ring 615 having a ramp 626 for engaging domed plunger 624 in the locked state. Piezoelectric actuator 622 is preferably of the type AL-2, available from Servocell Ltd., Harlow, UK.

Complete locking and unlocking control is still furnished by either the key 530 on the interior side or the thumb turn (not shown) on the exterior side. Note: The key and thumb turn may be positioned on respective interior and exterior sides as may be desired in any particular application.

When the lock has been placed in the locked state by either of the above, the locked state may be overridden in one of three ways: by energizing of actuator 622, by rotation of key 530 or the use of thumb turn, not shown.

Figure 18:
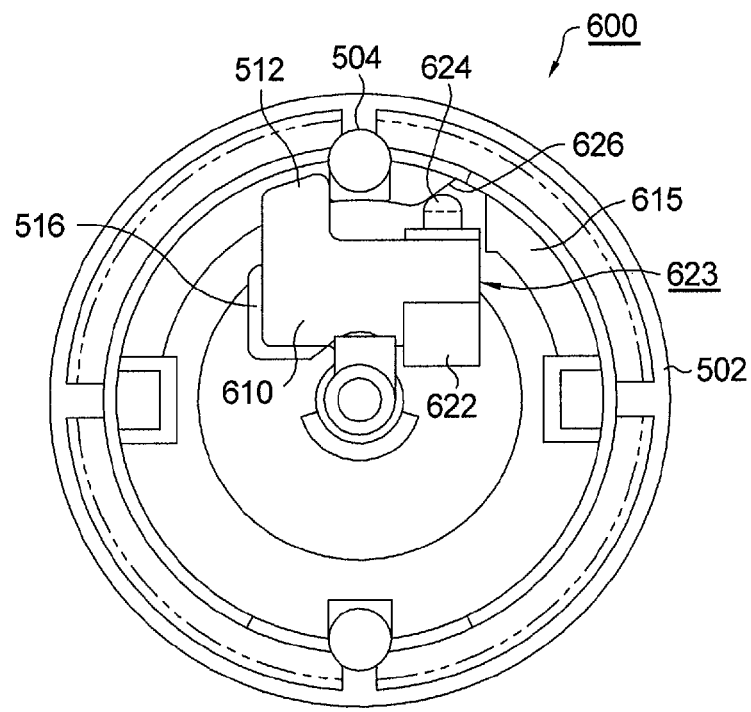
FIG. 18 is an elevational view showing the door locking mechanism of FIG. 17 modified with a piezoelectric latch in accordance with the present invention.
Figure 19:
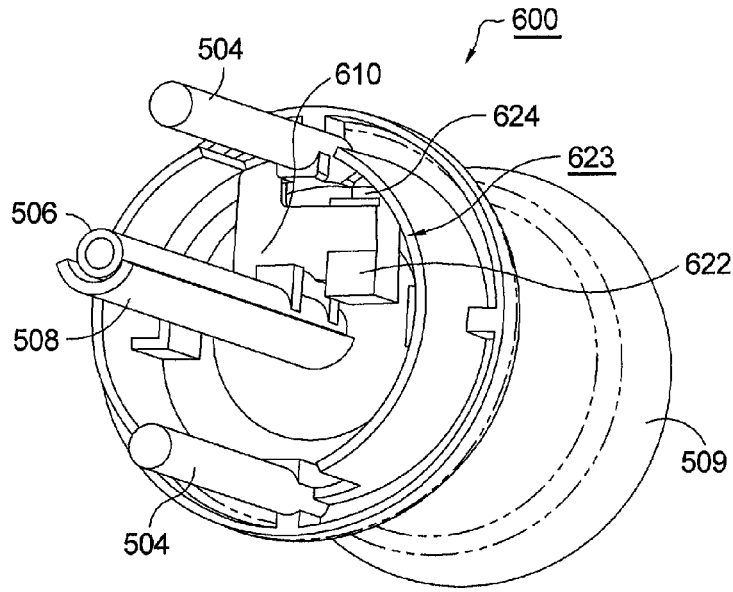
FIG. 19 is an isometric view of the mechanism shown in FIG. 18.
Figure 20:
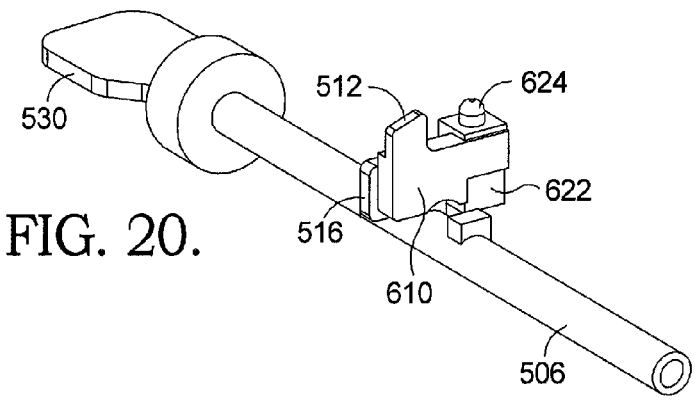
FIGS. 20 and 21 are differing isometric views of the unlocking and rotatable portion of the mechanism shown in FIGS. 18 and 19.
Figure 22:
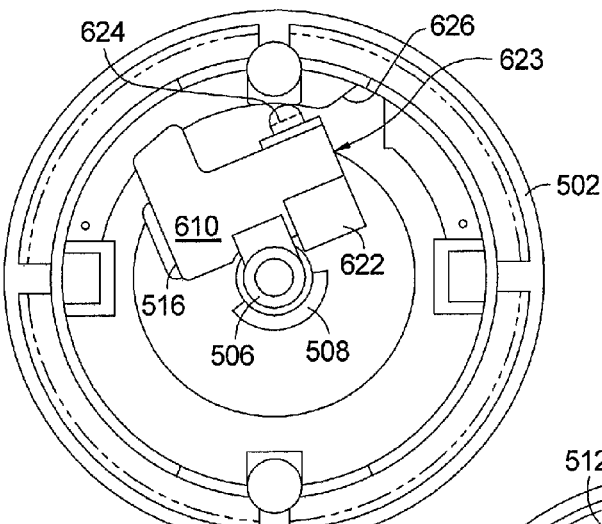
FIG. 22 is an elevational view showing the mechanism of FIG. 18 becoming unlocked after activation of the piezoelectric cell.

Referring to FIG. 22, when piezoelectric actuator 622 is energized, handle/knob 509 may be turned in one direction (unidirectional) to open the door despite the door's being mechanically key-locked. In its un-energized state, piezoelectric actuator 622 remains rigid with domed plunger 624 extended as shown in FIG. 18. Energizing of actuator 622 removes rigid support for plunger 624. Torque on handle/knob 509 (FIG. 19), locking shaft 506, and floating tab 610 urges the dome of plunger 624 against ramp 626, causing plunger 624 to be forced into assembly 623. When the plunger has cleared the ramp, tab 610 may be turned as shown, unlocking the mechanism. Note that cam plate 516 is not activated and tab 610 has not been moved radially inwards of hub 502. Note also that handle/knob 509 can be turned in only one direction to act against piezo actuator 622. Turning the handle/knob in the other rotational direction, even with piezoelectric actuator 622 energized, will cause locking tang 512 and rotation of knob 509 to be blocked by post 504. In a variation of the embodiment shown in FIGS. 22-24, and referring to FIG. 23, locking tang 512 may be replaced with a second piezo actuator assembly 623 and ring 615 may be further modified with a second mirror-imaged ramp 626 on the opposite side of post 504. With this variation, handle/knob 509 may be turned in either rotational direction (bi-directional) to open the door upon energizing the actuators despite the door's being mechanically key locked.

Figure 23:
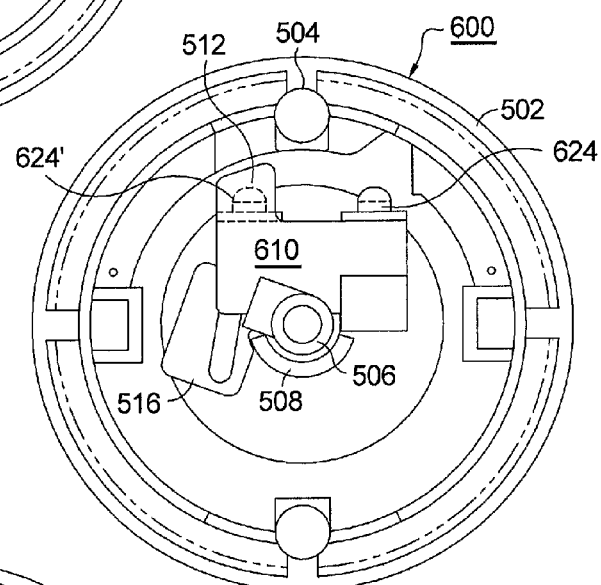
FIGS. 23 and 24 are sequential views showing the mechanism of FIG. 18 becoming unlocked by action of a key without activation of the piezoelectric cell.
Figure 24:
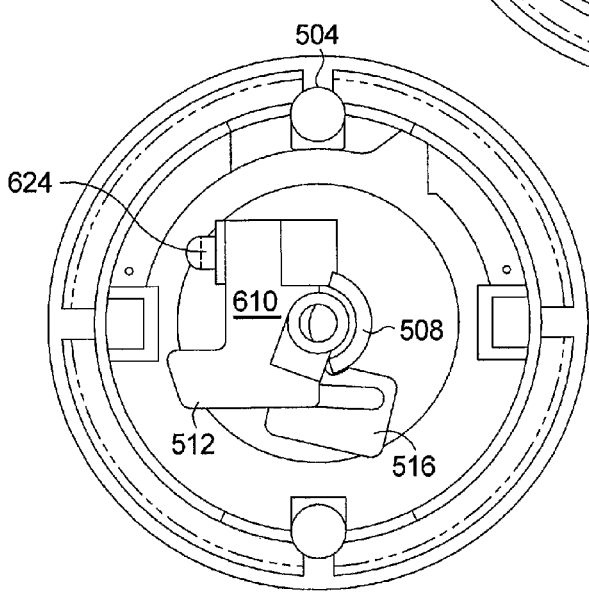

Referring now to FIGS. 23 and 24, handle-lock set 600 may also be unlocked conventionally by the key. As described above, when key 530 and locking shaft 506 are turned, cam plate 516 urges tab 610 radially inwards of hub 502 such that tang 512 and plunger 624, or a pair of plungers 624, no longer straddle connecting post 504 (FIG. 23), allowing latch engaging shaft 508 to be rotated (FIG. 24).

Figure 25:
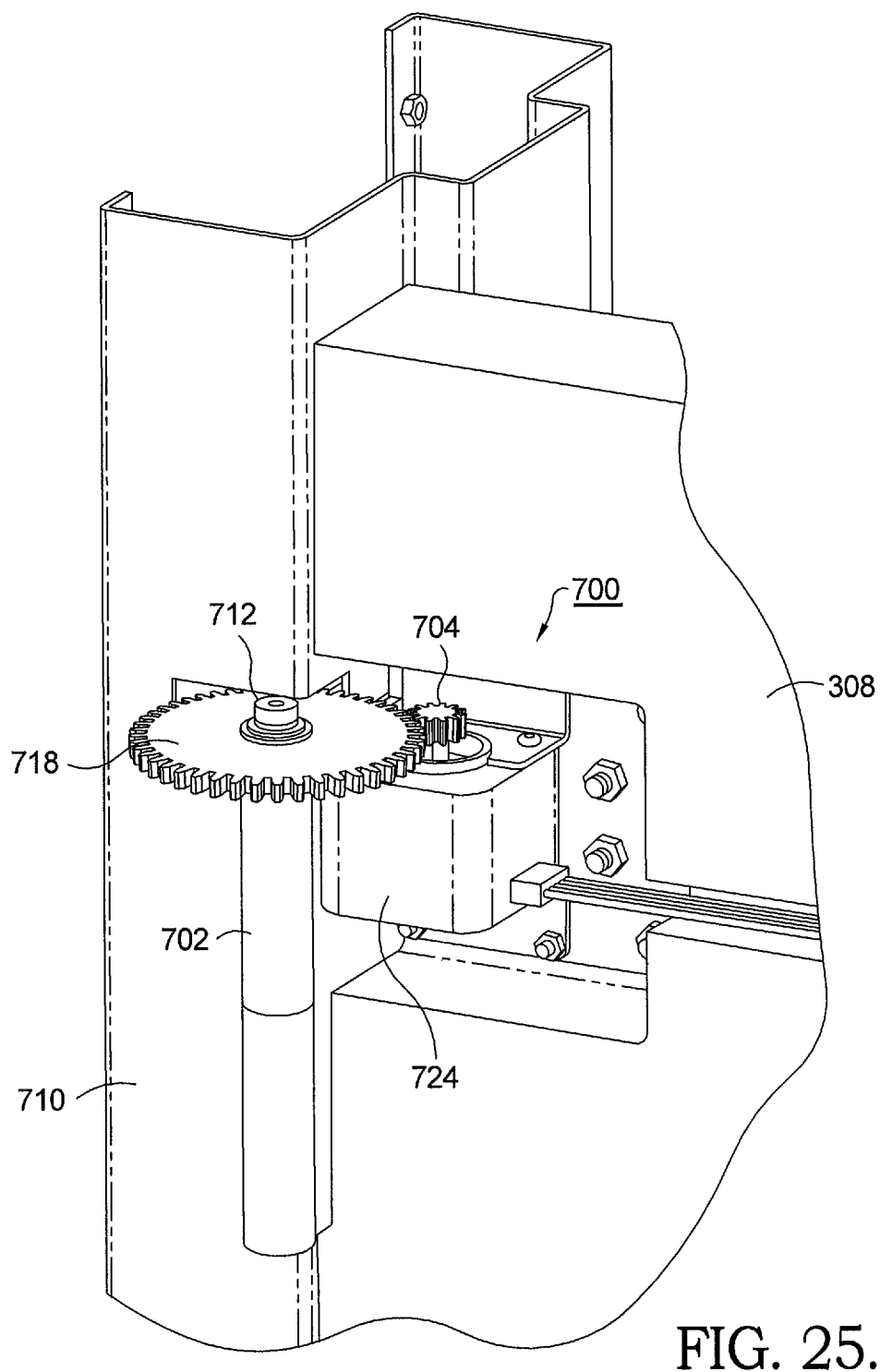
FIG. 25 is an isometric view in partial cutaway showing a stepper motor generator harvester having a rotor-mounted pinion gear meshing with a stationary ring gear like that shown in FIG. 11.
Figure 26:
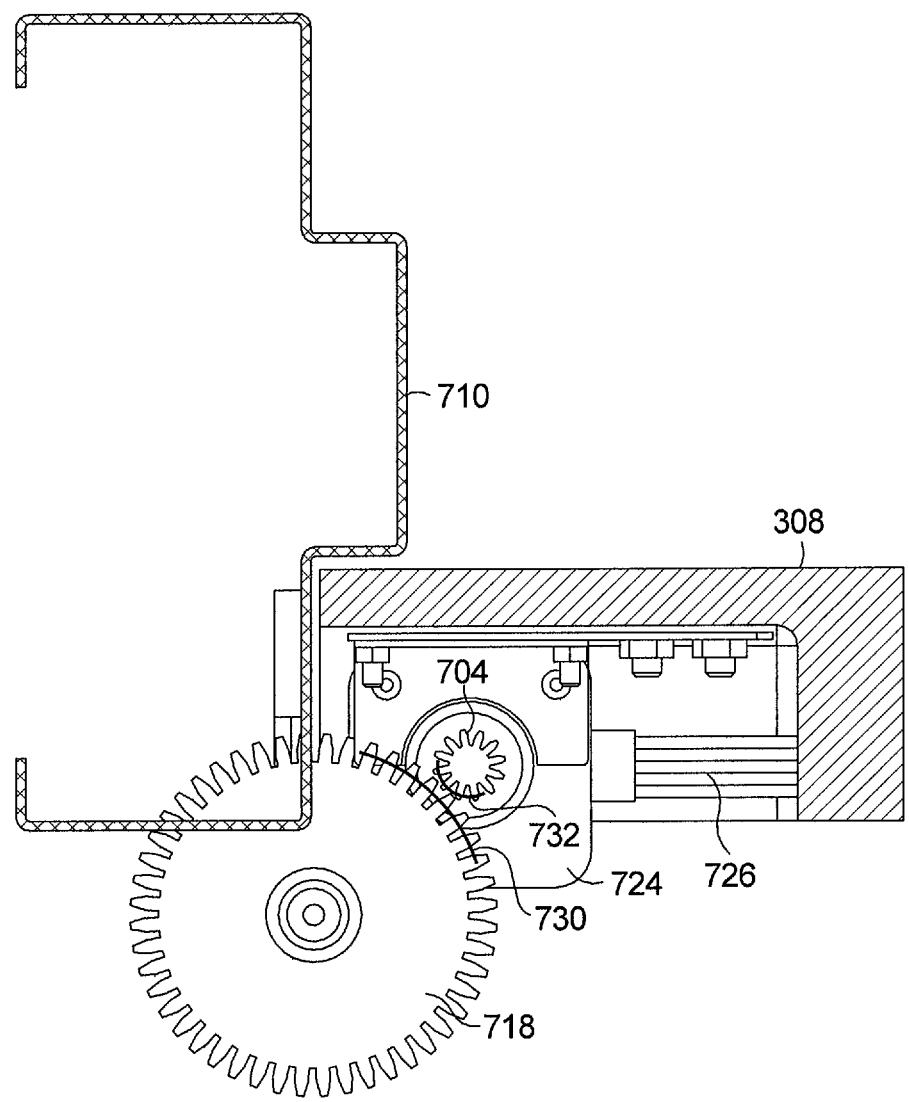
FIGS. 26 and 27 are cross-sectional horizontal views of the mechanism shown in FIG. 25, showing the door in closed and opened positions, respectively.
Figure 27:
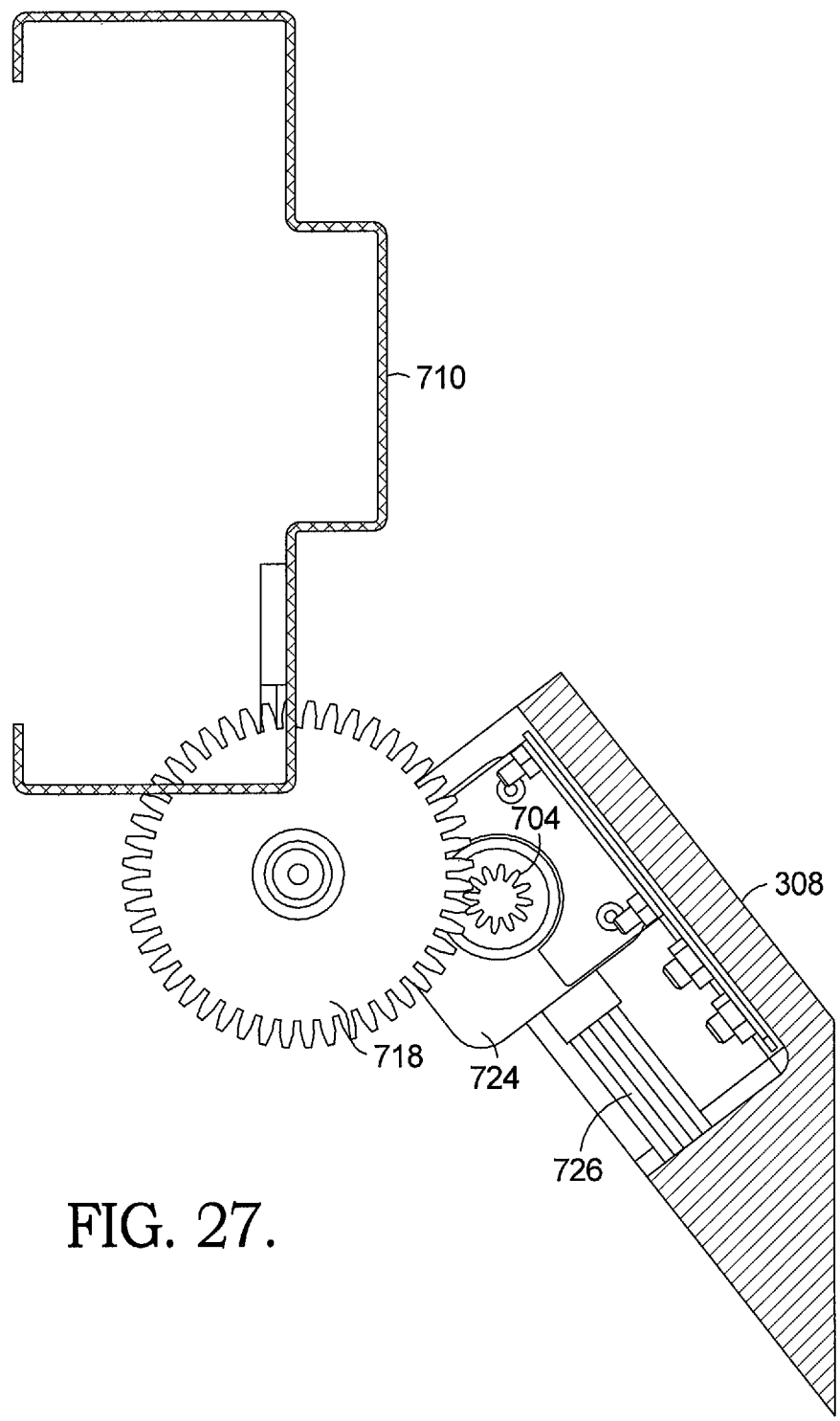

Referring now to FIGS. 25 through 27, a further embodiment 700 of an energy harvester is shown. A stationary drive member such as drive gear 718 is mounted to a fixed hinge pin 712 of a door hinge 702 mounted on a frame 710. An energy harvester mounted on a door 308 in the form of a stepper motor/generator 724 is provided with a driven member such as pinion gear 704 in meshing relationship with drive gear 718. As door 308 is rotated in either the opening or the closing direction (FIG. 27) on hinge pin 712, pinion gear 704 is rotated causing lobes of the magnetic rotor (not visible) of stepper motor/generator 724 to serially pass by and excite the coils (not visible) within the stepper motor in known fashion, generating an output series of two-phase sinusoidal signals along wire leads 726 that may be captured as stored electrical energy by the thin film battery in power management module 14 (FIGS. 1 and 2). Preferably, the sinusoidal signals are rectified by passage through a pair of bridge rectifiers 730 shown in FIG. 29. attached to the DC charging input of MPM 14 at connector J2 (FIG. 2).

To reduce cost and noise, it is understood and contemplated by this invention that drive gear 718 can be replaced with a friction wheel having, for example, a resilient contact surface 730 and driven gear 704 can be replaced with a friction wheel having, for example, a mating resilient surface 732 (FIG. 26).

Figure 28:
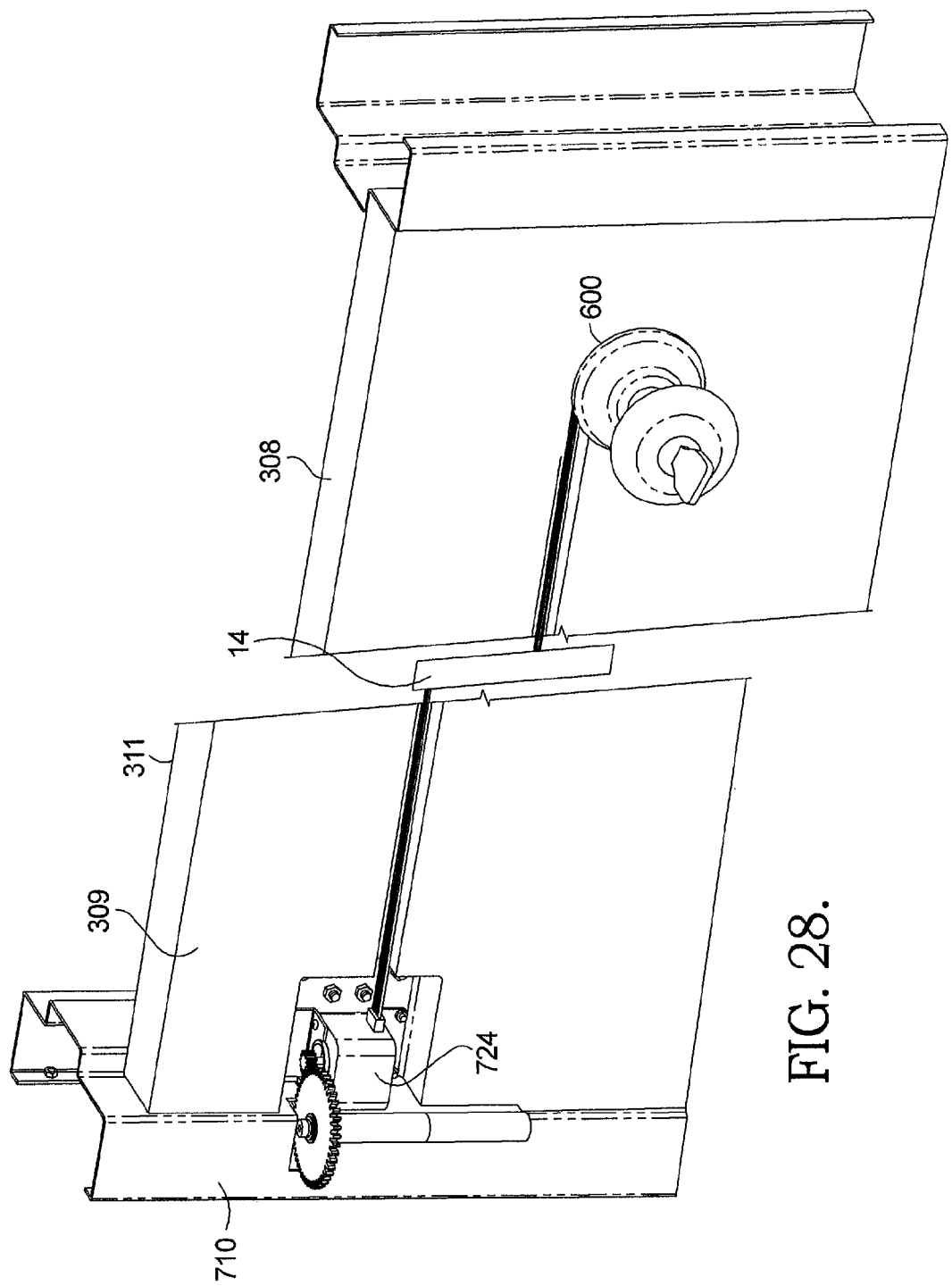
FIG. 28 is a door showing, in partial cut away, an energy harvester (exemplary stepper motor generator) mounted on a door hinge to provide energy to unlock the knob lock set mounted on the lock side of the door once an activation switch (not shown) is closed.
Figure 29:
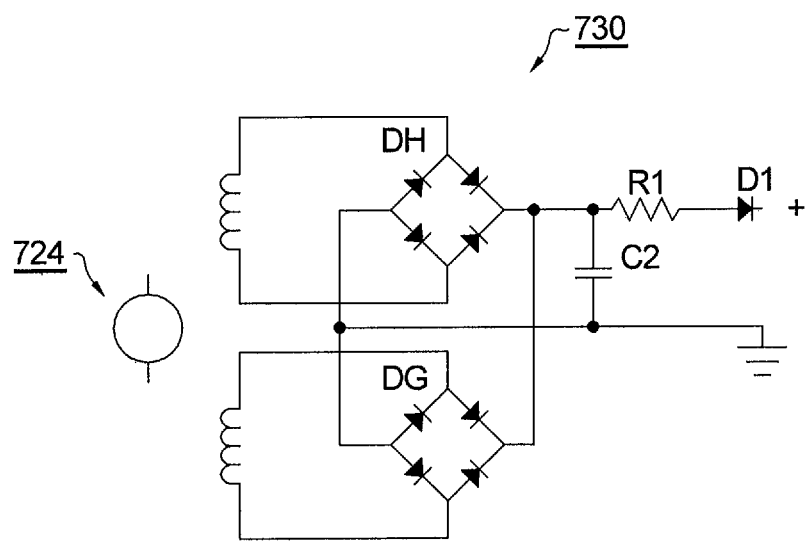
FIG. 29 is a dual-bridge circuit and stepper motor generator for connection to the micro power module at terminals J2.

Referring to FIG. 28, in a door 308, such as for example a Rite Door manufactured by Adams Rite Co. Pomona, Calif., an energy harvester (exemplarily a stepper motor/generator 724 in accordance with the present invention) is coupled to a micro power module 14, as described above, and a piezoelectric door lock (exemplarily a key-in-the-knob lock set 600 in accordance with the present invention as shown in FIGS. 18-24). While stepper motor/generator 724 is shown exposed through surface 309 of door 308, it is understood that motor/generator 724 and interconnecting wires may be completely confined between opposing door surfaces 309, 311, of the exemplary door so that motor/generator 724 is not readily visible or readily accessible from either surfaces.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A system for operating an electric door release mechanism, said electric door release mechanism including a piezoelectric actuator operatively connected to said electric door release mechanism to release a latched door, the system comprising:
   a piezoelectric energy harvester capable of collecting energy released by movement of said door lockable by said electric door release mechanism, wherein said electric door release mechanism is electrically connected to said piezoelectric energy harvester, wherein said electric door release mechanism receives electrical energy from said piezoelectric energy harvester, and wherein at least a portion of said electrical energy is received by said piezoelectric actuator to release said latched door.

2. A system in accordance with claim 1 further comprising a voltage boost circuit operationally connected to said piezoelectric energy harvester.

3. A system in accordance with claim 2 further comprising a power module including a battery disposed in a circuit between said piezoelectric energy harvester and said voltage boost circuit.

4. A system in accordance with claim 3 further comprising an actuator discharge circuit disposed between said piezoelectric actuator and said battery to recycle a portion of the electrical energy used to operate said electric door release mechanism.

5. A system in accordance with claim 1 wherein said energy collected by said piezoelectric energy harvester is used to power a device selected from the group consisting of an illumination device, a keypad and a video display.

6. A system in accordance with claim 1 wherein said piezoelectric energy harvester comprises an energy input portion and an energy harvesting portion.

7. A system in accordance with claim 6 wherein said energy input portion includes an input member configured to be actionable by said movement of said door, wherein said energy harvesting portion includes a capture member adapted for receiving mechanical input from said input member and configured for exciting said energy harvesting portion.

8. A system in accordance with claim 7 wherein said input member includes a gear.

9. A system in accordance with claim 8 wherein said input member includes a linear gear.

10. A system in accordance with claim 6 wherein said input member is a drive member and said capture member is a driven member.

11. A system in accordance with claim 8 wherein said capture member includes a sprocket portion disposed for movement with said capture member, said sprocket portion includes a shaft and at least one radially disposed sprocket actuator connected to said shaft, wherein said sprocket actuator is configured for making contact with said piezoelectric energy harvester and wherein said piezoelectric energy harvester is excited by said contact.

12. A system in accordance with claim 11 wherein said at least one radially disposed sprocket actuator is movable connected to said shaft.

13. An electric door release system for use in securing a door hinged in a frame, comprising:
a) an energy harvester;
b) a voltage boost circuit operationally connected to said energy harvester;
c) a mechanical door lock including a piezoelectric actuator connected to said voltage boost circuit;
d) a power module including a battery disposed in a circuit between said energy harvester and said voltage boost circuit; and
e) a recycle actuator discharge circuit disposed between said piezoelectric actuator and said power module battery.

14. A system in accordance with claim 13 further comprising a mechanical actuator assembly to actuate said energy harvester.

15. A system in accordance with claim 13 wherein said energy harvester is selected from the group consisting of piezoelectric, electromagnetic, solar cell, stepper motor generator, and RF.

16. A system in accordance with claim 13 wherein said energy harvester is a piezoelectric harvester disposable in a hinge region of said door and frame.

17. A system in accordance with claim 13 wherein said energy harvester is a stepper motor/generator disposable in a hinge region of said door and frame.

18. A door security system comprising:
a) a door hinged to a frame;
b) an electrical door release mounted on one of said door and said frame and including a piezoelectric actuator;
c) a voltage boost circuit operationally connected to said piezoelectric actuator;
d) an energy harvester mounted to one of said door and said frame and connected to said voltage boost circuit;
e) a mechanical actuator assembly mounted for stimulating said energy harvester when said door is pivoting on its hinge;
f) a power module including a battery disposed in a circuit between said energy harvester and said voltage boost circuit; and
g) a recycle actuator discharge circuit disposed between said piezoelectric actuator and said power module battery.

19. A system in accordance with claim 18 wherein said energy harvester is a piezoelectric harvester disposed in a hinge region of said door and frame.

20. A system in accordance with claim 18 wherein said energy harvester is a stepper motor/generator disposed in a hinge region of said door and frame.

21. An electric door strike comprising:
a) a keeper movable between a first position and a second position; and
b) a piezoelectric actuator blockable by a piezo cell in said piezoelectric actuator between a first position and a second position,
wherein when said piezoelectric actuator is in said first position, said keeper is prevented from moving from said first position to said second position, and
wherein when said piezoelectric actuator is in said second position, said keeper is permitted to move from said first position to said second position, and
wherein said keeper includes a first slope surface and said piezoelectric actuator includes a second slope surface wherein said first and second slope surfaces are in engageable contact with each other when said piezoelectric actuator is in said first position and said keeper is in said first position.

22. A handle-lock set, comprising:
a) a lock integral with a locking shaft;
b) a rotatable handle integral with a latch engaging shaft;
c) a cam mounted on said locking shaft;
d) a hub having a ramp; and
d) a floating tab operable by said cam and comprising an assembly including a piezoelectric actuator and a plunger engagable with said ramp,
wherein de-energizing of said piezoelectric actuator causes said plunger to prevent rotation of said latch engaging shaft, and
wherein energizing of said piezoelectric actuator enables rotation of said latch engaging shaft.

23. A handle-lock set in accordance with claim 22 wherein rotation of said lock and locking shaft during said de-energizing causes said floating tab to be urged radially inward of said hub, enabling rotation of said handle and latch engaging shaft.

24. A system for operating an electric door release mechanism, said electric door release mechanism including a piezoelectric actuator, the system comprising:
- a piezoelectric energy harvester capable of collecting energy released by movement of a door lockable by said electric door release mechanism, wherein said electric door release mechanism is electrically connected to said piezoelectric energy harvester, wherein said electric door release mechanism receives electrical energy from said piezoelectric energy harvester, and wherein at least a portion of said electrical energy is used to operate said electric door release mechanism;
- a voltage boost circuit operationally connected to said piezoelectric energy harvester;
- a power module including a battery disposed in a circuit between said piezoelectric energy harvester and said voltage boost circuit; and
- an actuator discharge circuit disposed between said piezoelectric actuator and said battery to recycle a portion of the electrical energy used to operate said electric door release mechanism.

25. A system in accordance with claim 24 wherein said piezoelectric actuator receives said at least a portion of said electrical energy to release said latched door.

26. A system in accordance with claim 24 wherein said energy collected by said piezoelectric energy harvester is used to power a device selected from the group consisting of an illumination device, a keypad and a video display.

27. A system in accordance with claim 24 wherein said piezoelectric energy harvester comprises an energy input portion and an energy harvesting portion.

28. A system in accordance with claim 27 wherein said energy input portion includes an input member configured to be actionable by said movement of said door, wherein said energy harvesting portion includes a capture member adapted for receiving mechanical input from said input member and configured for exciting said energy harvesting portion.

29. A system in accordance with claim 27 wherein said input member includes a gear.

30. A system in accordance with claim 29 wherein said input member includes a linear gear.

31. A system in accordance with claim 29 wherein said capture member includes a sprocket portion disposed for movement with said capture member, said sprocket portion includes a shaft and at least one radially disposed sprocket actuator connected to said shaft, wherein said sprocket actuator is configured for making contact with said piezoelectric energy harvester and wherein said piezoelectric energy harvester is excited by said contact.

32. A system in accordance with claim 31 wherein said at least one radially disposed sprocket actuator is movable connected to said shaft.

33. A system in accordance with claim 27 wherein said input member is a drive member and said capture member is a driven member.

34. A system for operating an electric door release mechanism comprising:
- a piezoelectric energy harvester capable of collecting energy released by movement of a door lockable by said electric door release mechanism, wherein said electric door release mechanism is electrically connected to said piezoelectric energy harvester, wherein said electric door release mechanism receives electrical energy from said piezoelectric energy harvester, and wherein at least a portion of said electrical energy is used to operate said electric door release mechanism,
- wherein said piezoelectric energy harvester comprises an energy input portion and an energy harvesting portion,
- wherein said energy input portion includes an input member configured to be actionable by said movement of said door, said input member including a gear,
- wherein said energy harvesting portion includes a capture member adapted for receiving mechanical input from said gear and configured for exciting said energy harvesting portion, said capture member including a sprocket portion disposed for movement with said capture member, said sprocket portion including a shaft and at least one radially disposed sprocket actuator connected to said shaft, wherein said sprocket actuator is configured for making contact with said piezoelectric energy harvester, and wherein said piezoelectric energy harvester is excited by said contact.

35. A system in accordance with claim 34 further comprising a voltage boost circuit operationally connected to said piezoelectric energy harvester.

36. A system in accordance with claim 34 further comprising a power module including a battery disposed in a circuit between said piezoelectric energy harvester and said voltage boost circuit.

37. A system in accordance with claim 36 wherein said electric door release mechanism includes a piezoelectric actuator, and wherein the system further comprising an actuator discharge circuit disposed between said piezoelectric actuator and said battery to recycle a portion of the electrical energy used to operate said electric door release mechanism.

38. A system in accordance with claim 34 wherein said electric door release mechanism includes an actuator operatively connected to said electric door release mechanism to release a latched door, wherein said actuator receives said at least a portion of said electrical energy to release said latched door, and wherein said actuator is a piezoelectric actuator.

39. A system in accordance with claim 34 wherein said energy collected by said piezoelectric energy harvester is used to power a device selected from the group consisting of an illumination device, a keypad and a video display.

40. A system in accordance with claim 34 wherein said input member includes a linear gear.

41. A system in accordance with claim 34 wherein said input member is a drive member and said capture member is a driven member.

42. A system in accordance with claim 34 wherein said at least one radially disposed sprocket actuator is movable connected to said shaft.

* * * * *